(12) United States Patent
Affinito

(10) Patent No.: US 6,274,204 B1
(45) Date of Patent: *Aug. 14, 2001

(54) METHOD OF MAKING NON-LINEAR OPTICAL POLYMER

(75) Inventor: John D. Affinito, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/212,977

(22) Filed: Dec. 16, 1998

(51) Int. Cl.$^7$ ................... B05D 3/06; B05D 3/10
(52) U.S. Cl. ............ 427/497; 427/509; 427/551; 427/553; 427/562; 427/595; 427/255.14; 427/255.6; 427/255.7; 427/294; 427/398.1; 427/421
(58) Field of Search .................... 427/497, 509, 427/551, 553, 562, 595, 248.1, 255.14, 255.6, 255.7, 294, 299, 398.1, 421

(56) References Cited

U.S. PATENT DOCUMENTS

| | | |
|---|---|---|
| 3,475,307 | 10/1969 | Knox et al. . |
| 3,607,365 | 9/1971 | Lindlof . |
| 4,098,965 | 7/1978 | Kinsman . |
| 4,283,482 | 8/1981 | Hattori et al. . |

(List continued on next page.)

FOREIGN PATENT DOCUMENTS

| | | |
|---|---|---|
| 704 297 | 2/1968 | (BE) . |
| 19603746 | 4/1997 | (DE) . |
| 0 340 935 | 11/1989 | (EP) . |
| 0 390 540 | 10/1990 | (EP) . |

(List continued on next page.)

OTHER PUBLICATIONS

Inoue et al, Proc. Jpn. Congr. Mater. Res., vol. 33, pp. 177–9, 1990.*

Affinito, J.D., et al., "Vacuum Deposition of Polymer Electrolytes On Flexible Substrates", "Proceedings of the Ninth International Conference on Vacuum Web Coating", Nov. 1995 ed R. Bakish, Bakish Press 1995, pp. 20–36.

Vossen, J.L., et al., Thin Film Processes, Academic Press, 1978, Part II, Chapter II–1, Glow Discharge Sputter Deposition, p. 12–63; Part IV, Chapter IV–1 Plasma Deposition of Inorganic Compounds and Chapter IV–2 Glow Discharge Polymerization, p. 335–397.

Penning, F.M., Electrical Discharges in Gasses, Gordon and Breach Science Publishers, 1965, Chapters 5–6, p. 19–35, and Chapter 8, p.41–50.

Affinito, J.D., et al., "High Rate Vacuum Deposition of Polymer Electrolytes", Journal Vacuum Science Technology A 14(3), May/Jun. 1996.

Inoue et al., Proc. Jpn. Congr. Mater. Res., vol. 33, p. 177–9, 1990.

PCT International Search Report for International application No. PCT/US 99/30102 dated Sep. 5, 2000.

G. Gustafson, Y. Cao, G.M. Treacy, F. Klavetter, N. Colaneri, and A.J. Heeger, Nature, vol 35, Jun. 11, 1992, pp. 477–479.

(List continued on next page.)

Primary Examiner—Erma Cameron
(74) Attorney, Agent, or Firm—Killworth, Gottman, Hagan & Schaeff L.L.P.

(57) ABSTRACT

The method of the present invention for making a non-linear optical polymer layer has the steps of (a) flash evaporating a coating material monomer having a plurality of non-linear optical molecules as an evaporate; (b) cryocondensing the evaporate on a surface; and (c) crosslinking the cryocondensed evaporate. The surface may be electrically biased for poling during crosslinking.

13 Claims, 3 Drawing Sheets

U.S. PATENT DOCUMENTS

| | | |
|---|---|---|
| 4,581,337 | 4/1986 | Frey et al. . |
| 4,624,867 | 11/1986 | Iijima et al. . |
| 4,695,618 | 9/1987 | Mowrer . |
| 4,842,893 | 6/1989 | Yializis et al. ............ 427/44 |
| 4,954,371 | 9/1990 | Yializis ................ 427/44 |
| 5,032,461 | 7/1991 | Shaw et al. . |
| 5,237,439 | 8/1993 | Misono et al. . |
| 5,260,095 | 11/1993 | Affinito ............. 427/124 |
| 5,354,497 | 10/1994 | Fukuchi et al. . |
| 5,395,644 | 3/1995 | Affinito . |
| 5,427,638 | 6/1995 | Goetz et al. . |
| 5,440,446 | 8/1995 | Shaw et al. . |
| 5,536,323 | 7/1996 | Kirlin et al. . |
| 5,547,508 * | 8/1996 | Affinito ................ 118/50 |
| 5,554,220 | 9/1996 | Forrest et al. . |
| 5,576,101 | 11/1996 | Saitoh et al. . |
| 5,607,789 | 3/1997 | Treger et al. . |
| 5,620,524 | 4/1997 | Fan et al. . |
| 5,629,389 | 5/1997 | Roitman et al. . |
| 5,654,084 | 8/1997 | Egert . |
| 5,681,615 | 10/1997 | Affinito et al. ............ 427/255.6 |
| 5,681,666 | 10/1997 | Treger et al. . |
| 5,684,084 | 11/1997 | Lewin et al. . |
| 5,686,360 | 11/1997 | Harvey, III et al. . |
| 5,693,956 | 12/1997 | Shi et al. . |
| 5,711,816 | 1/1998 | Kirlin et al. . |
| 5,725,909 | 3/1998 | Shaw et al. . |
| 5,731,661 | 3/1998 | So et al. . |
| 5,747,182 | 5/1998 | Friend et al. . |
| 5,757,126 | 5/1998 | Harvey, III et al. . |
| 5,759,329 | 6/1998 | Krause et al. . |
| 5,782,355 | 2/1999 | Hueschen . |
| 5,792,550 | 8/1998 | Phillips et al. . |
| 5,811,177 | 9/1998 | Shi et al. . |
| 5,811,183 | 9/1998 | Shaw et al. . |
| 5,821,692 | 10/1998 | Rogers et al. . |
| 5,844,363 | 12/1998 | Gu et al. ............. 313/506 |
| 5,902,641 * | 5/1999 | Affinito ............. 427/255.2 |
| 5,902,688 | 5/1999 | Antoniadis et al. . |
| 5,904,958 | 5/1999 | Dick et al. . |
| 5,912,069 | 6/1999 | Yializis et al. . |
| 5,922,161 | 7/1999 | Wu et al. . |
| 5,945,174 | 8/1999 | Shaw et al. . |
| 5,948,552 | 9/1999 | Antoniadis et al. . |
| 5,965,907 | 10/1999 | Huang et al. . |
| 5,996,498 | 12/1999 | Lewis . |
| 6,045,864 | 4/2000 | Lyons et al. . |
| 6,083,628 | 7/2000 | Yalizis . |

FOREIGN PATENT DOCUMENTS

| | | |
|---|---|---|
| 0 299 753 | 2/1993 | (EP) . |
| 0 547 550 | 6/1993 | (EP) . |
| 0 590 467 | 4/1994 | (EP) . |
| 0 722 787 | 7/1996 | (EP) . |
| 0 787 826 | 8/1997 | (EP) . |
| 0 916 394 | 5/1999 | (EP) . |
| 0 931 850 | 7/1999 | (EP) . |
| 0 977 469 | 2/2000 | (EP) . |
| 63 136316 | 6/1988 | (JP) . |
| 01-018441 * | 1/1989 | (JP) . |
| 02-183230 * | 7/1990 | (JP) . |
| 08 325713 | 12/1996 | (JP) . |
| 09 059763 | 3/1997 | (JP) . |
| WO 87 07848 | 12/1987 | (WO) . |
| WO 95 10117 | 4/1995 | (WO) . |
| WO 97 04885 | 2/1997 | (WO) . |
| WO 97 22631 | 6/1997 | (WO) . |
| WO 98 10116 | 3/1998 | (WO) . |
| WO 98 18852 | 5/1998 | (WO) . |
| WO 99 16657 | 4/1999 | (WO) . |
| WO 99 16931 | 4/1999 | (WO) . |

OTHER PUBLICATIONS

J.D. Affinito, M.E. Gross, C.A. Coronado, G.L. Graff, E.N. Greenwell, and P.M. Martin, *Polymer–Oxide Transparent Barrier Layers Produced Using the PML Process,* $39^{th}$ Annual Technical Conference Proceedings of the Society of Vacuum Coaters, Vacuum Web Coating Session, 1996, pp. 392–397.

J.D. Affinito, Stephan, Eufinger, M.E. Gross, G.L. Graff, and P.M. Martin, *PML/Oxide/PML Barrier Layer Performance Differences Arising From Use of UV or Electron Beam Polymerization of the PML Layers,* Thin Solid Films, vol 308, 1997, pp. 19–25.

* cited by examiner

METHOD OF MAKING NON-LINEAR OPTICAL POLYMER

FIELD OF THE INVENTION

The present invention relates generally to a method of making non-linear optical polymer films. Additional layers of polymer or metal may be added under vacuum as well.

As used herein, the term "(meth)acrylic"is defined as "acrylic or methacrylic". Also, "(meth)acylate"is defined as "acrylate or methacrylate".

As used herein, the term "cryocondense"and forms thereof refers to the physical phenomenon of a phase change from a gas phase to a liquid phase upon the gas contacting a surface having a temperature lower than a dew point of the gas.

As used herein, the term "conjugated"refers to a chemical structure of alternating single and double bonds between carbon atoms in a carbon atom chain.

BACKGROUND OF THE INVENTION

The basic process of plasma enhanced chemical vapor deposition (PECVD) is described in THIN FILM PROCESSES, J. L. Vossen, W. Kern, editors, Academic Press, 1978, Part IV, Chapter IV-1 Plasma Deposition of Inorganic Compounds, Chapter IV- 2 Glow Discharge Polymerization, herein incorporated by reference. Briefly, a glow discharge plasma is generated on an electrode that may be smooth or have pointed projections. Traditionally, a gas inlet introduces high vapor pressure monomeric gases into the plasma region wherein radicals are formed so that upon subsequent collisions with the substrate, some of the radicals in the monomers chemically bond or cross link (cure) on the substrate. The high vapor pressure monomeric gases include gases of $CH_4$, $SiH_4$, $C_2H_6$, $C_2H_2$, or gases generated from high vapor pressure liquid, for example styrene (10 torr at 87.4 EF (30.8 EC)), hexane (100 torr at 60.4 EF (15.8 EC)), tetramethyidisiloxane (10 torr at 82.9 EF (28.3 EC) 1,3,-dichlorotetra-methyldisiloxane) and combinations thereof that may be evaporated with mild controlled heating. Because these high vapor pressure monomeric gases do not readily cryocondense at ambient or elevated temperatures, deposition rates are low (a few tenths of micrometer/min maximum) relying on radicals chemically bonding to the surface of interest instead of cryocondensation. Remission due to etching of the surface of interest by the plasma competes with reactive deposition. Lower vapor pressure species have not been used in PECVD because heating the higher molecular weight monomers to a temperature sufficient to vaporize them generally causes a reaction prior to vaporization, or metering of the gas becomes difficult to control, either of which is inoperative.

The basic process of flash evaporation is described in U.S. Pat. No. 4,954,371 herein incorporated by reference. This basic process may also referred to as polymer multi-layer (PML) flash evaporation. Briefly, a radiation polymerizable and/or cross linkable material is supplied at a temperature below a decomposition temperature and polymerization temperature of the material. The material is atomized to droplets having a droplet size ranging from about 1 to about 50 microns. An ultrasonic atomizer is generally used. The droplets are then flash vaporized, under vacuum, by contact with a heated surface above the boiling point of the material, but below the temperature which would cause pyrolysis. The vapor is cryocondensed on a substrate then radiation polymerized or cross linked as a very thin polymer layer.

According to the state of the art of making plasma polymerized films, PECVD and flash evaporation or glow discharge plasma deposition and flash evaporation have not been used in combination. However, plasma treatment of a substrate using glow discharge plasma generator with inorganic compounds has been used in combination with flash evaporation under a low pressure (vacuum) atmosphere as reported in J. D. Affinito, M. E. Gross, C. A. Coronado, and P. M. Martin, A Vacuum Deposition Of Polymer Electrolytes On Flexible Substrates. "Paper for Plenary talk in A Proceedings of the Ninth International Conference on Vacuum Web Coating", November 1995 ed R. Bakish, Bakish Press 1995, pg 20–36., and as shown in FIG. 1a. In that system, the plasma generator 100 is used to etch the surface 102 of a moving substrate 104 in preparation to receive the monomeric gaseous output from the flash evaporation 106 that cryocondenses on the etched surface 102 and is then passed by a first curing station (not shown), for example electron beam or ultra-violet radiation, to initiate cross linking and curing. The plasma generator 100 has a housing 108 with a gas inlet 110. The gas may be oxygen, nitrogen, water or an inert gas, for example argon, or combinations thereof. Internally, an electrode 112 that is smooth or having one or more pointed projections 114 produces a glow discharge and makes a plasma with the gas which etches the surface 102. The flash evaporator 106 has a housing 116, with a monomer inlet 118 and an atomizing nozzle 120, for example an ultrasonic atomizer. Flow through the nozzle 120 is atomized into particles or droplets 122 which strike the heated surface 124 whereupon the particles or droplets 122 are flash evaporated into a gas that flows past a series of baffles 126 (optional) to an outlet 128 and cryocondenses on the surface 102. Although other gas flow distribution arrangements have been used, it has been found that the baffles 126 provide adequate gas flow distribution or uniformity while permitting ease of scaling up to large surfaces 102. A curing station (not shown) is located downstream of the flash evaporator 106. The monomer may be an [meth-]acrylate (FIG. 1b).

For non-linear optical polymers, traditional methods employ spin coating.

In one type of spin coating non-linear optical molecules are attached to the polymer backbone. Poling is then by heating to a temperature above a glass transition temperature to align the non-linear optical groups. However, the polymer backbone is not aligned and over time the poled groups relax to their non-poled condition which is unsuitable for long term devices. In another type of spin coating, the non-linear optical groups are simply mixed with the monomer without attachment. Again, the poled groups relax over time. Another disadvantage is in making a non-linear optical polymer part of a multi-layer construction wherein the non-linear optical polymer must be physically moved or transferred to an area where the additional layer is applied, for example vacuum deposition.

Therefore, there is a need for a high deposition rate method for making non-linear optical polymers that do not relax to an unpoled condition and which does not require transfer for making a multi-layer article.

SUMMARY OF THE INVENTION

The present invention is a method of making a non-linear optical polymer layer. The method has the steps of (a) flash evaporating a coating monomer containing a plurality of non-linear optical molecules into an evaporate; (b) cryocondensing the evaporate on a surface; and (c) crosslinking the condensed evaporate. Alternatively, the evaporate may pass a glow discharge electrode creating a glow discharge monomer plasma from the evaporate prior to cryocondensation whereupon radicals created by the glow discharge initiate self curing in the absence of a radiation cure.

It is, therefore, an object of the present invention to provide a method of making a non-linear optical polymer via flash evaporation.

An advantage is that the conjugation (if any) is preserved during curing. Another advantage of the present invention is that multiple layers of materials may be combined. For example, as recited in U.S. Pat. Nos. 5,547,508 and 5,395,644, 5,260,095, hereby incorporated by reference, multiple polymer layers, alternating layers of polymer and metal, and other layers may be made with the present invention in the vacuum environment.

An advantage of the present invention with plasma curing is that it is insensitive to a direction of motion of the substrate because the deposited monomer layer is self curing. Another advantage of the present invention is the ability to make conformal coatings. Because of rapid self curing, the monomer has less time to flow and is therefore more uniformly thick.

The subject matter of the present invention is particularly pointed out and distinctly claimed in the concluding portion of this specification. However, both the organization and method of operation, together with further advantages and objects thereof, may best be understood by reference to the following detailed description in combination with the drawings wherein like reference characters refer to like elements.

DESCRIPTION OF THE PREFERRED EMBODIMENT(S)

According to the present invention, a non-linear optical polymer layer is made by the steps of:
(a) providing a liquid monomer having a plurality of non-linear optical molecules;
(b) flash evaporating the liquid monomer forming a composite vapor; and
(c) continuously cryocondensing the composite vapor on a cool substrate and cross linking a cryocondensed monomer layer thereby forming the non-linear optical polymer layer.

Figure 1A:
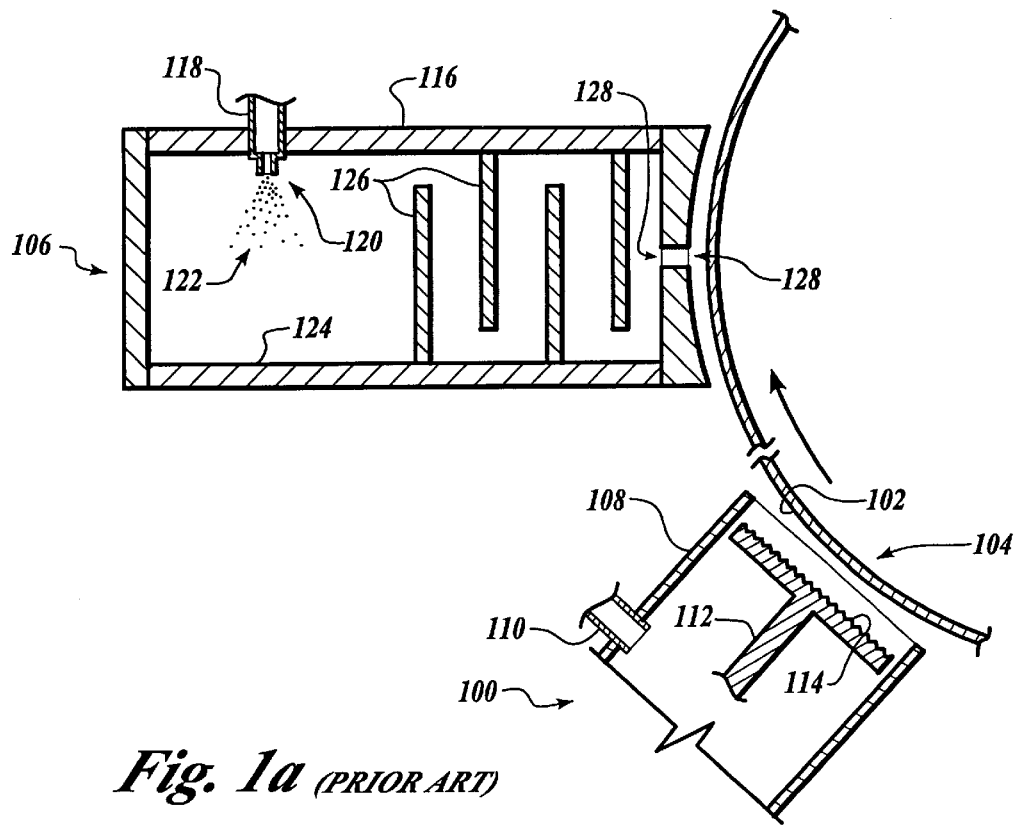
FIG. 1a is a cross section of a prior art combination of a glow discharge plasma generator with inorganic compounds with flash evaporation.
Figure 1B:
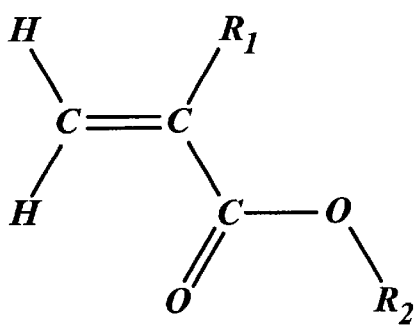
FIG. 1b is a chemical diagram of (meth)acrylate.

The step of crosslinking may produce a polymer layer either by radiation curing or by self curing. In radiation curing (FIG. 1), the monomer liquid may include a photoinitiator. In self curing, a combined flash evaporator, glow discharge plasma generator is used without either the e-beam gun or ultraviolet light.

Flash evaporation has the steps:
(a) supplying a continuous liquid flow of the liquid monomer into a vacuum environment at a temperature below both the decomposition temperature and the polymerization temperature of the liquid monomer;
(b) continuously atomizing the liquid monomer into a continuous flow of droplets;
(c) continuously vaporizing the droplets by continuously contacting the droplets on a heated surface having a temperature at or above a boiling point of the liquid monomer and of the particles, but below a pyrolysis temperature, forming a composite vapor.

By using flash evaporation, the liquid monomer with non-linear optical molecules is vaporized so quickly that reactions that generally occur from heating a liquid material to an evaporation temperature simply do not occur. Further, control of the rate of evaporate delivery is strictly controlled by the rate of material delivery to the inlet 118 of the flash evaporator 106.

The liquid monomer may be simply a plurality of non-linear optical molecules, but more likely is a plurality of non-linear optical molecules mixed with a base monomer. The plurality of non-linear optical molecules may be liquid or solid as for example solid particles.

The base monomer may be any monomer useful in flash evaporation for making polymer films. Base monomer includes but is not limited to allyls, alkynes, phenyl acetylene, acrylate monomer, for example tripropylenegylcol diacrylate, tetraethylene glycol diacrylate, tripropylene glycol monoacrylate, caprolactone acrylate and combinations thereof; methacrylate monomers; and combinations thereof. The (meth)acrylate monomers are particularly useful in flash evaporation. It is further preferred that the base monomer have a low vapor pressure at ambient temperatures so that it will readily cryocondense. Preferably, the vapor pressure of the base monomer is less than about 10 torr at 83° F. (28.3° C.), more preferably less than about 1 torr at 83° F. (28.3° C.), and most preferably less than about 10 millitorr at 83° F. (28.3° C.).

Figure 5A:
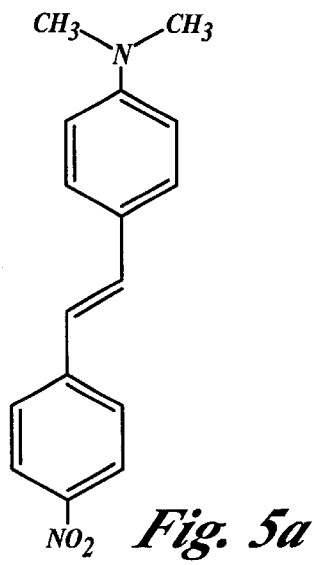
FIG. 5a is a chemical diagram of DANS.
Figure 5B:
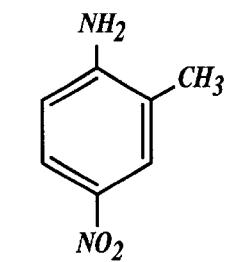
FIG. 5b is a chemical diagram of MNA.
Figure 5C:
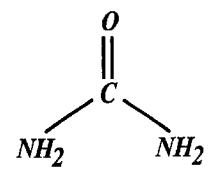
FIG. 5c is a chemical diagram of urea.

Non-linear optical molecules include but are not limited to DimethylAmino NitroStilbene (DANS, FIG. 5a), Methyl NitroAnaline (MNA FIG. 5b), urea (FIG. 5c) and combinations thereof.

During flash evaporation, prior to condensation, the non-linear optical molecules have the opportunity to attach to a backbone of a base monomer. Upon condensation and crosslinking, the resulting polymer layer is a non-linear optical polymer layer. If, in addition, the substrate has an applied electrical field during deposition (condensation and crosslinking) poling aligns the backbone as well as the attached non-linear optical molecules in a manner that is permanent and avoids relaxation.

When the non-linear optical molecules are mixed with a base monomer, the non-linear optical molecules may be in the form of particles that may be soluble or insoluble with the base monomer. The particles are preferably of a volume much less than about 5000 cubic micrometers (diameter about 21 micrometers) or equal thereto, preferably less than or equal to about 4 cubic micrometers (diameter about 2 micrometers). In a preferred embodiment, the particles are sufficiently small with respect to particle density and liquid monomer density and viscosity that the settling rate of the particles within the base monomer is several times greater than the amount of time to transport a portion of the particle base monomer mixture from a reservoir to the atomization nozzle. It is to be noted that it may be necessary to stir the particle base monomer mixture in the reservoir to maintain suspension of the particles and avoid settling.

The mixture of base monomer and particles may be considered a slurry, suspension or emulsion, and the particles may be solid or liquid. The mixture may be obtained by several methods. One method is to mix particles of a specified size into the monomer. The particles of a solid of a specified size may be obtained by direct purchase or by making them by one of any standard techniques, including but not limited to milling from large particles, precipitation from solution, melting/spraying under controlled atmospheres, rapid thermal decomposition of precursors from solution as described in U.S. Pat. No. 5,652,192 hereby incorporated by reference. The steps of U.S. Pat. No. 5,652,192 are making a solution of a soluble precursor in a solvent and flowing the solution through a reaction vessel, pressurizing and heating the flowing solution and forming substantially insoluble particles, then quenching the heated flowing solution and arresting growth of the particles. Alternatively, larger sizes of solid material may be mixed into liquid monomer then agitated, for example ultrasonically, to break the solid material into particles of sufficient size.

Liquid particles may be obtained by mixing an immiscible liquid with the monomer liquid and agitating by ultrasonic or mechanical mixing to produce liquid particles within the liquid monomer. Immiscible liquids include, for example alkynes, and/or allyls.

Other particle(s) may be included with the base monomer that are insoluble or partially insoluble particle type having a boiling point below a temperature of the heated surface in the flash evaporation process. Insoluble particle includes but is not limited to MNA, DANS, urea. Upon spraying, the droplets may be particles alone, particles surrounded by liquid monomer and liquid monomer alone. Since both the liquid monomer and the particles are evaporated, it is of no consequence either way. It is, however, important that the droplets be sufficiently small that they are completely vaporized. Accordingly, in a preferred embodiment, the droplet size may range from about 1 micrometer to about 50 micrometers.

During flash evaporation, the liquid monomer is evaporated. In the cases wherein the liquid monomer is a combination of a base monomer and non-linear optical molecules, the non-linear optical molecules may combine with the base monomer in the vapor phase prior to cryocondensation.

Figure 2:
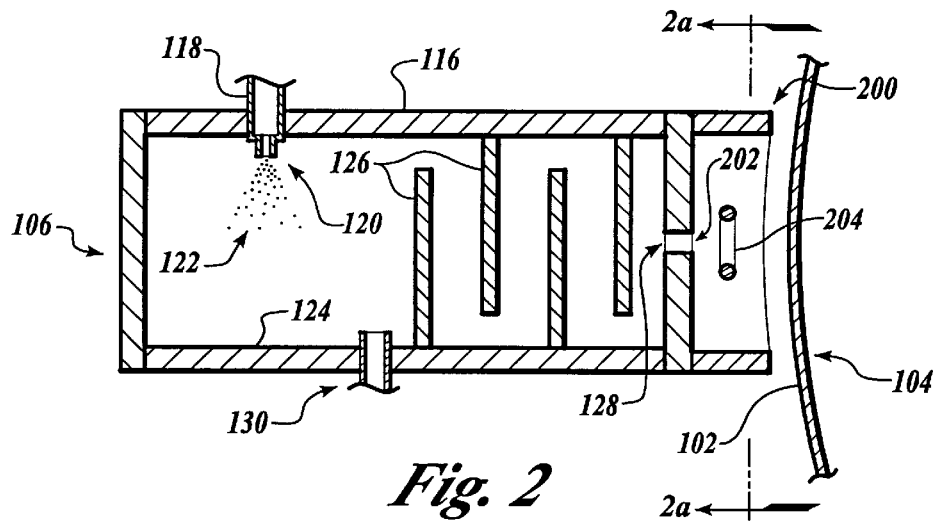
FIG. 2 is a cross section of the apparatus of the present invention of combined flash evaporation and glow discharge plasma deposition.

Making a non-linear optical polymer layer may be done with the apparatus shown in FIG. 2. The apparatus and method of the present invention are preferably within a low pressure (vacuum) environment or chamber. Pressures preferably range from about $10^{-1}$ torr to $10^{-6}$ torr. The flash evaporator 106 has a housing 116, with a monomer inlet 118 and an atomizing nozzle 120. Flow through the nozzle 120 is atomized into particles or droplets 122 which strike the heated surface 124 whereupon the particles or droplets 122 are flash evaporated into a gas or evaporate that flows past a series of baffles 126 to an evaporate outlet 128 and cryocondenses on the surface 102. Cryocondensation on the baffles 126 and other internal surfaces is prevented by heating the baffles 126 and other surfaces to a temperature in excess of a cryocondensation temperature or dew point of the evaporate. Although other gas flow distribution arrangements have been used, it has been found that the baffles 126 provide adequate gas flow distribution or uniformity while permitting ease of scaling up to large surfaces 102.

For self-curing or plasma curing, a glow discharge electrode 204 may be located near the evaporate outlet 128 for creating a glow discharge plasma from the evaporate. In the embodiment shown in FIG. 2, the glow discharge electrode 204 is placed in a glow discharge housing 200 having an evaporate inlet 202 proximate the evaporate outlet 128. In this embodiment, the glow discharge housing 200 and the glow discharge electrode 204 are maintained at a temperature above a dew point of the evaporate. The glow discharge plasma exits the glow discharge housing 200 and cryocondenses on the surface 102 of the substrate 104. It is preferred that the substrate 104 is kept at a temperature below a dew point of the evaporate, preferably ambient temperature or cooled below ambient temperature to enhance the cryocondensation rate.

In a preferred embodiment, the substrate 104 is moving and may be electrically grounded, electrically floating or electrically biased with an impressed voltage to pole the cryocondensate.

When a glow discharge plasma is used, an impressed voltage may also draw charged species from the glow discharge plasma. If the substrate 104 is electrically biased, it may even replace the electrode 204 and be, itself, the electrode which creates the glow discharge plasma from the monomer gas.

Figure 2A:
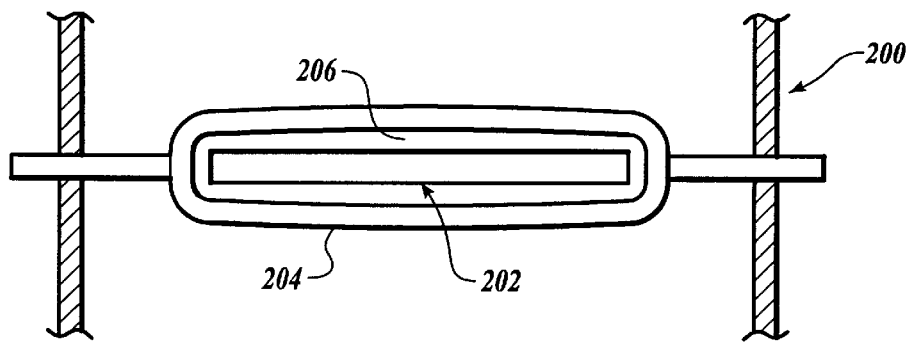
FIG. 2a is a cross section end view of the apparatus of the present invention.

Substantially not electrically biased means that there is no impressed voltage although a charge may build up due to static electricity or due to interaction with the plasma. A preferred shape of the glow discharge electrode 204, is shown in FIG. 2a. In this preferred embodiment, the glow discharge electrode 204 is separate from the substrate 104 and shaped so that evaporate flow from the evaporate inlet 202 substantially flows through an electrode opening 206. Any electrode shape can be used to create the glow discharge, however, the preferred shape of the electrode 204 does not shadow the plasma from the evaporate issuing from the outlet 202 and its symmetry, relative to the monomer exit slit 202 and substrate 104, provides uniformity of the evaporate vapor flow to the plasma across the width of the substrate while uniformity transverse to the width follows from the substrate motion.

The spacing of the electrode 204 from the substrate 104 is a gap or distance that permits the plasma to impinge upon the substrate. This distance that the plasma extends from the electrode will depend on the evaporate species, electrode 204/ substrate 104 geometry, electrical voltage and frequency, and pressure in the standard way as described in detail in ELECTRICAL DISCHARGES IN GASSES, F. M. Penning, Gordon and Breach Science Publishers, 1965, and summarized in THIN FILM PROCESSES, J. L. Vossen, W. Kern, editors, Academic Press, 1978, Part II, Chapter Il-1, Glow Discharge Sputter Deposition, both hereby incorporated by reference.

Figure 3:
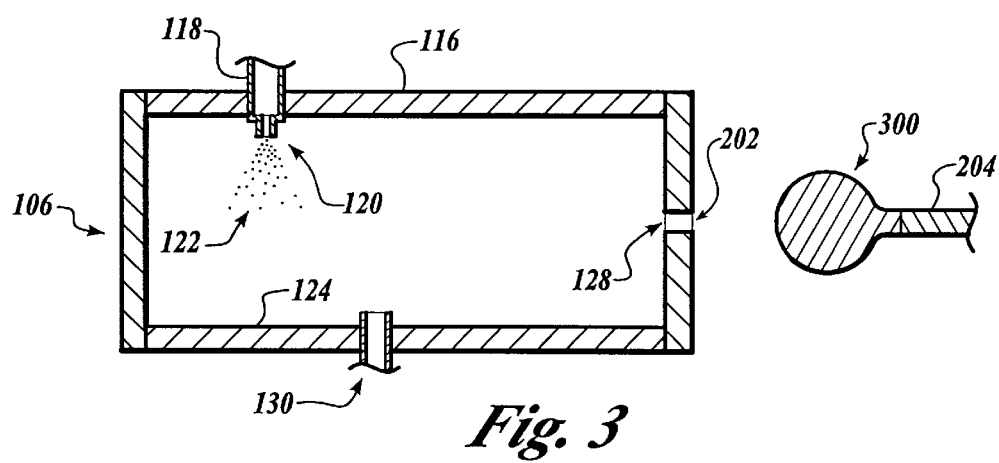
FIG. 3 is a cross section of the present invention wherein the substrate is the electrode.
Figure 4:
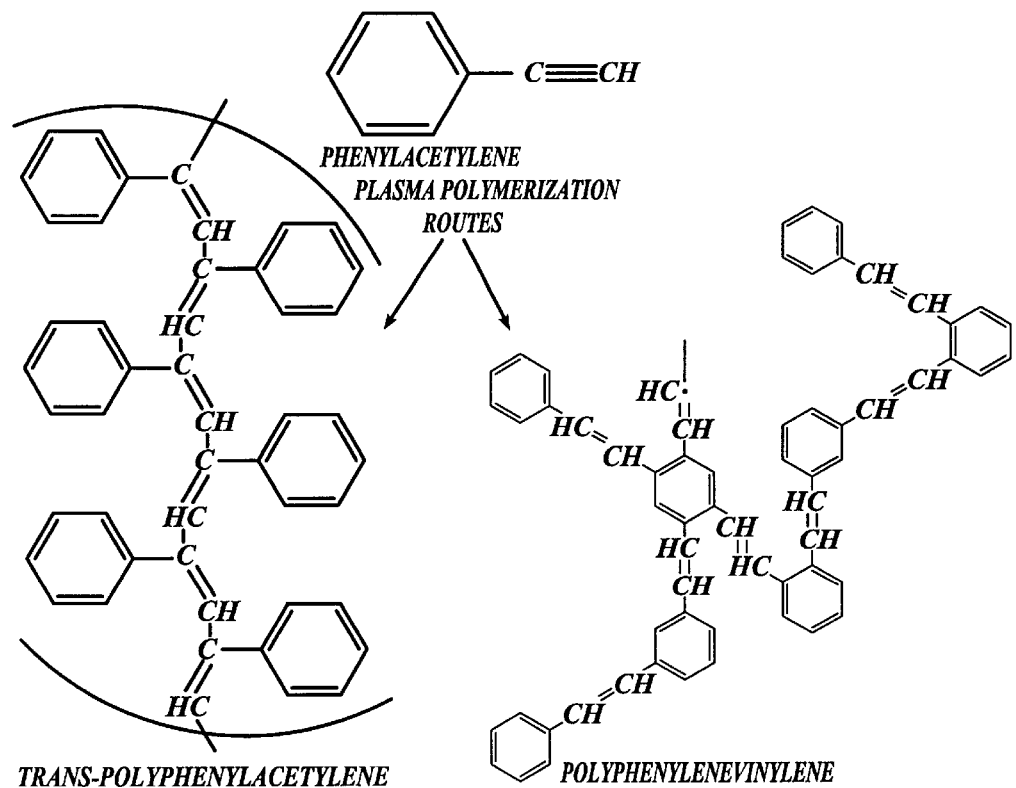
FIG. 4 is a chemical diagram including phenylacetylene.

An apparatus suitable for batch operation is shown in FIG. 3. In this embodiment, the glow discharge electrode 204 is sufficiently proximate a part 300 (substrate) that the part 300 is an extension of or part of the electrode 204. Moreover, the part is below a dew point to allow cryocondensation of the glow discharge plasma on the part 300 and thereby coat the part 300 with the monomer condensate and self cure into a polymer layer. Sufficiently proximate may be connected to, resting upon, in direct contact with, or separated by a gap or distance that permits the plasma to impinge upon the substrate. This distance that the plasma extends from the electrode will depend on the evaporate species, electrode 204/ substrate 104 geometry, electrical voltage and frequency, and pressure in the standard way as described in ELECTRICAL DISCHARGES IN GASSES, F. M. Penning, Gordon and Breach Science Publishers, 1965, hereby incorporated by reference. The substrate 300 may be stationary or moving during cryocondensation. Moving includes rotation and translation and may be employed for controlling the thickness and uniformity of the monomer layer cryocondensed thereon. Because the cryocondensation occurs rapidly, within milli-seconds to seconds, the part may be removed after coating and before it exceeds a coating temperature limit.

In addition to the evaporate from the material, additional gases may be added within the flash evaporator 106 through a gas inlet 130 upstream of the evaporate outlet 128, preferably between the heated surface 124 and the first baffle 126 nearest the heated surface 124. Additional gases may be organic or inorganic for purposes included but not limited to ballast, reaction and combinations thereof. Ballast refers to providing sufficient molecules to keep the plasma lit in circumstances of low evaporate flow rate. Reaction refers to chemical reaction to form a compound different from the evaporate. Additional gases include but are not limited to group VIII of the periodic table, hydrogen, oxygen, nitrogen, chlorine, bromine, polyatomic gases including for example carbon dioxide, carbon monoxide, water vapor, and combinations thereof.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A method of making a non-linear optical polymer layer, comprising the steps of:
   (a) providing a liquid monomer having a plurality of non-linear optical molecules;
   (b) flash evaporating the liquid monomer forming an evaporate; and
   (c) continuously cryocondensing the evaporate on a cool substrate and cross linking a cryocondensed monomer layer thereby forming the non-linear optical polymer layer.

2. The method as recited in claim 1, wherein flash evaporating comprises the steps of:
   (a) supplying a continuous liquid flow of the liquid monomer into a vacuum environment at a temperature below both the decomposition temperature and the polymerization temperature of the liquid monomer;
   (b) continuously atomizing the liquid monomer into a continuous flow of droplets;
   (c) continuously vaporizing the droplets by continuously contacting the droplets on a heated surface having a temperature at or above a boiling point of the liquid monomer, but below the pyrolysis temperature, forming a composite vapor.

3. The method as recited in claim 1, wherein said cross linking is radiation cross linking.

4. The method as recited in claim 2, further comprising the step of passing the composite vapor past a glow discharge electrode prior to cryocondensing, wherein said cross linking is self curing.

5. The method as recited in claim 1, wherein said liquid monomer is selected from the group consisting of allyl, alkyne, phenyl acetylene, (meth-) acrylate monomer, and combinations thereof.

6. The method as recited in claim 5, wherein (meth-) acrylate monomer is selected from the group consisting of tripropyleneglycol diacrylate, tetraethylene glycol diacrylate, tripropylene glycol monoacrylate, caprolactone acrylate, and combinations thereof.

7. The method as recited in claim 1, wherein said liquid monomer is a mixture of a base monomer with said plurality of non-linear optical molecules.

8. The method of claim 7 wherein the plurality of non-linear optical molecules are liquid.

9. The method of claim 7 wherein the plurality of non-linear optical molecules are solid.

10. The method as recited in claim 1, wherein said substrate is electrically biased thereby poling said cryocondensed liquid monomer prior to cross linking.

11. The method of claim 1 wherein the plurality of non-linear optical molecules are liquid.

12. The method of claim 1 wherein the plurality of non-linear optical molecules are solid.

13. A method of making a non-linear optical polymer layer, comprising the steps of:
   (a) providing a liquid monomer having a plurality of non-linear optical molecules selected from the group consisting of dimethylamino nitrostilbene, methyl nitroaniline, urea, and combinations thereof;
   (b) flash evaporating the liquid monomer forming an evaporate; and
   (c) continuously cryocondensing the evaporate on a cool substrate and crosslinking a cryocondensed monomer layer thereby forming the non-linear optical polymer layer.

* * * * *